US009367460B2

(12) United States Patent
Klein et al.

(10) Patent No.: US 9,367,460 B2
(45) Date of Patent: *Jun. 14, 2016

(54) IMPLICIT I/O SEND ON CACHE OPERATIONS

(71) Applicant: International Business Machines Corporation, Armonk, NY (US)

(72) Inventors: Matthias Klein, Boeblingen (DE); Marco Kraemer, Sindelfingen (DE); Carsten Otte, Stuttgart (DE); Christoph Raisch, Gerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/310,163

(22) Filed: Jun. 20, 2014

(65) Prior Publication Data

US 2015/0199274 A1    Jul. 16, 2015

Related U.S. Application Data

(63) Continuation of application No. 14/155,495, filed on Jan. 15, 2014.

(51) Int. Cl.
  *G06F 13/00* (2006.01)
  *G06F 12/08* (2016.01)

(52) U.S. Cl.
  CPC ...... *G06F 12/0831* (2013.01); *G06F 2212/621* (2013.01)

(58) Field of Classification Search
  CPC .......... G06F 12/0831; G06F 2212/621; G06F 3/0653; G06F 3/0655; G06F 3/0659; G06F 9/546
  See application file for complete search history.

(56) References Cited

U.S. PATENT DOCUMENTS

| 7,234,004 | B2 | 6/2007 | Raisch |
| 7,715,428 | B2 | 5/2010 | Basso et al. |
| 8,156,261 | B2 | 4/2012 | Barry et al. |
| 8,250,260 | B2 | 8/2012 | Raisch et al. |
| 8,302,109 | B2 | 10/2012 | Arimilli et al. |
| 8,346,971 | B2 | 1/2013 | Roberts et al. |
| 8,429,315 | B1 * | 4/2013 | Chudgar ............ G06F 3/00 709/250 |
| 2010/0198998 | A1 * | 8/2010 | Hiramoto ........... G06F 13/124 710/23 |
| 2012/0272037 | A1 | 10/2012 | Bayer et al. |
| 2013/0208671 | A1 * | 8/2013 | Royz ............. H04L 25/00 370/329 |
| 2013/0339630 | A1 * | 12/2013 | Alexander ......... G06F 12/0808 711/144 |

OTHER PUBLICATIONS

U.S. Appl. No. 14/155,495, filed Jan. 15, 2014, entitled: "Implicit I/O Send on Cache Operations".

* cited by examiner

*Primary Examiner* — Kevin Verbrugge
*Assistant Examiner* — Candice Rankin
(74) *Attorney, Agent, or Firm* — Arnold B. Bangali

(57) ABSTRACT

A computer system for implicit input-output send on cache operations of a central processing unit is provided. The computer system comprises an aggregation queue of a central processing unit, storing input-output data of the central processing unit, wherein the aggregation queue transmits the input-output data to an input-output adaptor, and wherein the input-output data is transmitted in parallel with operations of the central processing unit. The computer system further comprises, a memory management unit of the central processing unit, interpreting address space descriptors for implicit input-output transmittal of the input-output data of the aggregation queue. The computer system further comprises, a cache traffic monitor of the central processing unit, transmitting the input-output data in an implicit input-output transmittal range between the cache traffic monitor and the aggregation queue, wherein the cache traffic monitor transmits cache protocol of the central processing unit to the memory management unit.

11 Claims, 7 Drawing Sheets

IMPLICIT I/O SEND ON CACHE OPERATIONS

CROSS REFERENCE

The present application is a continuation of and claims priority under 35 U.S.C. §120 of U.S. patent application Ser. No. 14/155,495, filed on Jan. 15, 2014, which is incorporated by reference in its entirety.

FIELD OF THE INVENTION

The present invention relates generally to central processing unit (CPU) of computing systems, and more particularly, to implicit input-output send on cache operations of the CPU.

BACKGROUND

A central processing unit (CPU) cache is a cache used by CP of computing system to reduce the average time to access memory. The cache is a smaller, faster memory which stores copies of the data from frequently used main memory locations. Most CPUs have different independent caches, including instruction and data caches, where the data cache is usually organized as a hierarchy of more cache levels (L1, L2 etc.). For example, when the CPU needs to read or write data to a location in memory, it first verifies whether a copy of the data is in the cache. If so, the CPU immediately reads from or writes the data to the cache, which can be a faster process than reading from or writing the data to main memory.

SUMMARY

In one embodiment, a computer-implemented method is provided implicit input-output send on cache operations of a central processing unit. The computer-implemented method comprises, an aggregation queue of a central processing unit, storing, by one or more processors, input-output data of the central processing unit, wherein the aggregation queue transmits the input-output data to an input-output adaptor, and wherein the input-output data is transmitted in parallel with operations of the central processing unit. The computer-implemented method further comprises a memory management unit of the central processing unit, interpreting address space descriptors, by the one or more processors, for implicit input-output transmittal of the input-output data of the aggregation queue. The computer implemented method further comprises a cache traffic monitor of the central processing unit, transmitting, by the one or more processors, the input-output data in an implicit input-output transmittal range between the cache traffic monitor and the aggregation queue, wherein the cache traffic monitor transmits cache protocol of the central processing unit to the memory management unit.

In another embodiment, a computer system for implicit input-output send on cache operations of a central processing unit is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to store, by an aggregation queue of a central processing unit, input-output data of the central processing unit, wherein the aggregation queue transmits the input-output data to an input-output adaptor, and wherein the input-output data is transmitted in parallel with operations of the central processing unit. The computer system further comprises program instructions to interpret, by a memory management unit of the central processing unit, address space descriptors for implicit input-output transmittal of the input-output data of the aggregation queue. The computer system further comprises program instructions to transmit, by a cache traffic monitor of the central processing unit, the input-output data in an implicit input-output transmittal range between the cache traffic monitor and the aggregation queue, wherein the cache traffic monitor transmits cache protocol of the central processing unit to the memory management unit.

In yet another embodiment, a computer program product for implicit input-output send on cache operations of a central processing unit is provided. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises program instructions to store, by an aggregation queue of a central processing unit, input-output data of the central processing unit, wherein the aggregation queue transmits the input-output data to an input-output adaptor, and wherein the input-output data is transmitted in parallel with operations of the central processing unit. The computer program product further comprises program instructions to interpret, by a memory management unit of the central processing unit, address space descriptors for implicit input-output transmittal of the input-output data of the aggregation queue. The computer program product further comprises program instructions to transmit, by a cache traffic monitor of the central processing unit, the input-output data in an implicit input-output transmittal range between the cache traffic monitor and the aggregation queue, wherein the cache traffic monitor transmits cache protocol of the central processing unit to the memory management unit.

BRIEF DESCRIPTION OF THE SEVERAL VIEWS OF THE DRAWINGS

Novel characteristics of the invention are set forth in the appended claims. The invention will be best understood by reference to the following detailed description of the invention when read in conjunction with the accompanying figures, wherein like reference numerals indicate like components, and:

DETAILED DESCRIPTION

The present invention comprises functionality for initializing implicit input/output (I/O) write and send requests of a computing system. The implicit write and send requests are initiated without operating system interception on cache memory locations of central processing units (CPU) of the computing system. For example, according to at least one embodiment, the present invention includes a hardware implemented send memory management unit (MMU) (referred to hereinafter as sendMMU), that snoops on addresses of cache traffic within a cache hierarchy of the computing system. The present invention further includes an aggregation queue that accumulates smaller store operations on cachelines of the computing system into larger frames that are processed by an I/O engine of the computing system, as described below, in accordance with embodiments of the present invention.

Figure 1:
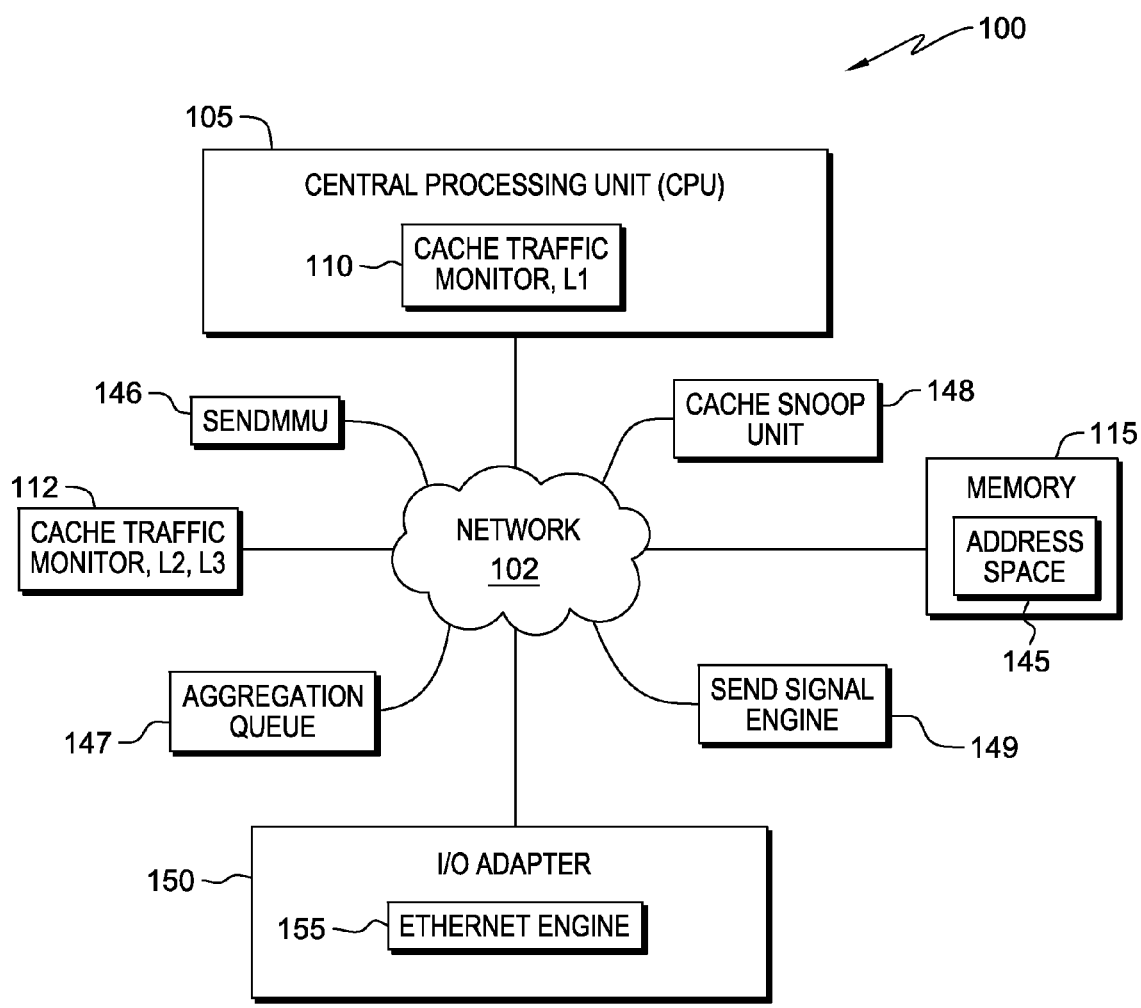
FIG. 1 is a functional diagram of implicit I/O send on cache computing environment for initializing implicit input/output (I/O) write and send requests of a computing system, in accordance with embodiments of the present invention.

The present invention will now be described in detail with referenced to the accompanying Figures. Referring now to FIG. 1, a functional diagram of implicit I/O send on cache computing environment 100 for initializing implicit input/output (I/O) write and send requests of a computing system, is shown, in accordance with at least one embodiment of the present invention. Implicit I/O send on cache computing environment 100 includes central processing unit (CPU) 105, memory 115, cache traffic monitor level 1 (L1), level 2 (L2), sendMMU 146, aggregation queue 147, cache snoop unit 148, send signal engine 149, and I/O adaptor 150, all interconnected over network 102.

CPU 105 is the hardware unit that executes program instructions of implicit I/O send on cache computing environment 100 by performing arithmetical, logical, and input/output operations for initializing implicit input/output (I/O) write and send requests of implicit I/O send on cache computing environment 100. CPU 105 includes level 1 (L1) cache traffic monitor 110 for storing data of implicit I/O send on cache computing environment 100. CPU 105 is connected through network 102 to further caches which may be level 2 and 3 caches, including, for example, level two (L2), level three (L3) of cache traffic monitor 112.

Network 102 includes one or more networks of any kind that can provide communication links between various devices and computers connected together within implicit I/O send on cache computing environment 100. Network 102 can also include connections, such as wired communication links, wireless communication links, or fiber optic cables. Network 102 can also be implemented as a number of different types of networks, including, for example, a local area network (LAN), wide area network (WAN) or a packet switched telephone network (PSTN), or some other networked system. Implicit I/O send on cache computing environment 100 can utilize the Internet with network 102 representing a worldwide collection of networks within implicit I/O send on cache computing environment 100. For example, the term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the World Wide Web (the web). Network 102 may be also be implemented as conventional data bus or by switches and point to point connections.

Memory 115 may comprise, for example, one or more computer-readable storage media, which may include random-access memory (RAM), or any other form of fixed or removable storage medium that can be used to carry or store desired program code and program data in the form of instructions or data structures and that can be accessed by other components of implicit I/O send on cache computing environment 100. Memory 115 includes address space 145. Address space 145 is composed of addressable memory locations for one or more program applications that execute program instructions of memory 115 within implicit I/O send on cache computing environment 100. Address space 145 also defines a range of discrete addresses of memory 115, each of which may correspond to a network host, peripheral device, disk sector, a memory cell or other logical or physical entity of memory 115.

sendMMU 146 snoops on addresses of cache traffic within a cache hierarchy of CPU 105 during system operations of implicit I/O send on cache computing environment 100. For example, snooping by sendMMU 146 involves a process wherein the individual caches of CPU 105, including, L1, L2, L3, monitor address lines for accesses to memory locations that they have cached. Snooping by sendMMU 146 can also include a write invalidate protocol, wherein a write operation is observed to a location that a cache has a copy of, and the cache controller invalidates its own copy of the snooped memory location of CPU 105.

Aggregation queue 147 receives data packets that contain an offset and cache line data of CPU 105 in memory, wherein aggregation queue 147 aggregates the stored data packets of cache lines per send context to contiguous areas of CPU 105 within implicit I/O send on cache computing environment 100. Aggregation queue 147 is operatively connected to the SendMMU 146, cache snoop unit 148 and send signal engine 149 of memory 115. Cache snoop unit 148 transports cache line data to aggregation queue 147. Send signal engine 149 receives data to be sent out together with metadata of implicit I/O send on cache computing environment 100 which is used by the send signal engine 149 to frame header of memory 115.

I/O adaptor 150 is a hardware element that provides access to main memory for reading and writing I/O instructions of implicit I/O send on cache computing environment 100. I/O adaptor 150 includes ethernet engine 155. Ethernet engine 155 generates communication protocols of I/O adaptor 150 within implicit I/O send on cache computing environment 100. For example, ethernet engine 155 includes TCP/IP connection which includes networking communications protocols that provides end to end connectivity that specifies how data of ethernet engine 155 should be formatted, addressed, transmitted, routed and received within implicit I/O send on cache computing environment 100.

Figure 2:
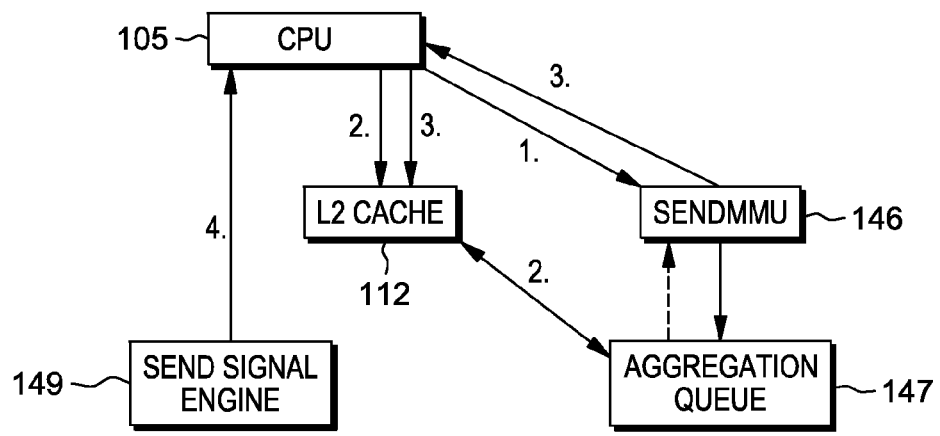
FIG. 2 is a network flow diagram of an end-to-end scenario for implicit I/O send on cache of at least one I/O request within implicit I/O send on a cache computing environment, in accordance with embodiments of the present invention.

FIG. 2 is a network flow diagram of an end-to-end scenario for implicit I/O send on cache of at least one I/O request within implicit I/O send on cache computing environment 100, in accordance with embodiments of the present invention. According to at least one embodiment, CPU 105 adds an address range to sendMMU 146, and marks the address range as implicit I/O send. (Flow 1). For example, an algorithm or program application of CPU 105 determines that a certain address range should be used for implicit I/O operations of implicit I/O send on cache computing environment 100. The address range can be consecutive or consist of multiple smaller ranges, including, for example, memory pages of CPU 105. In this manner, according to at least one embodiment, CPU 105 registers the address range in sendMMU 146. For example, the registration step can be executed through accessing I/O registers of CPU 105.

Moreover, additional information transmitted from CPU 105 to sendMMU 146 can include, for example, addresses, length fields, memory keys of implicit I/O operations of implicit I/O send on cache computing environment 100. The metadata can also include transmission control protocol (TCP) and internet protocol (IP), which are commonly known as TCP/IP, wherein the TCP/IP connection, which can be utilized by I/O adaptor 150 to generate valid communication protocol within implicit I/O send on cache computing environment 100.

According to further aspects, CPU 105 operates on data written by L2 cache of cache traffic monitor 112 to a cache hierarchy of implicit I/O send on cache computing environment 100, wherein implicit send mechanism of CPU 105 aggregates and transmit data in parallel within implicit I/O send on cache computing environment 100. (Flow 2). This, in this case, is either done through direct memory access (DMA) of memory 110, wherein CPU 105 utilizes special address ranges within its memory space to store data into an I/O engine 150. For example, according to at least one embodiment, memory area of memory 115 that is used for I/O engine 150 is cached, wherein, accessing the memory area can cause cache read/write access to memory 115, and wherein, according to at least one embodiment, the accessed cache read/write are utilized by sendMMU 146 to determine if further I/O operations should be executed, in accordance with embodiments of the present invention.

Further, according to aspects of the present invention, CPU 105 synchronizes to implicit send mechanism based on, first, initiating a full L2 cache writeout of area of memory to be sent to aggregation queue 147 for storing. This triggers sending of the missing pieces, or reading the "in flight"/"sent" indicators to sendMMU 146 and only triggers write out on "in flight" data by L2 cache writeout by signal engine 149. (Flow 4). For example, during the first instance of synchronization by CPU 105, implicit I/O send operation to sendMMU 146 needs an additional operation which "forces" the start of an I/O operation. In this manner, CPU 105 executes a synchronization instruction indicating which address ranges should be guaranteed to be forwarded to the I/O adaptor 150. In the second instance of synchronization by CPU 105, CPU 105 queries state information present in sendMMU 146, determines which data areas already have been sent, and then trigger the send of the missing areas of memory 115. According to at least one embodiment, a writeout complete the aggregation queue 147 is triggered by CPU 105 to send out all data without further aggregating for this set of I/O operations of implicit I/O send on cache computing environment 100. (Flow 4).

For example, data packet sizes as handled by the cache hierarchy are typically much smaller than data packet sizes handled by I/O networks like Ethernet or Infiniband. Therefore, aggregation queue 147 needs to aggregate data packets received by the cache hierarchy of I/O operations of implicit I/O send on cache computing environment 100 into larger chunks. For example, to allow the user algorithm to continue, CPU 105 needs to know when the send-out actually has completed. This can be accomplished by reading the "in flight" indicators in the sendMMU 146 or by reading other sendcomplete indicators of the I/O adaptor 150.

Figure 3:
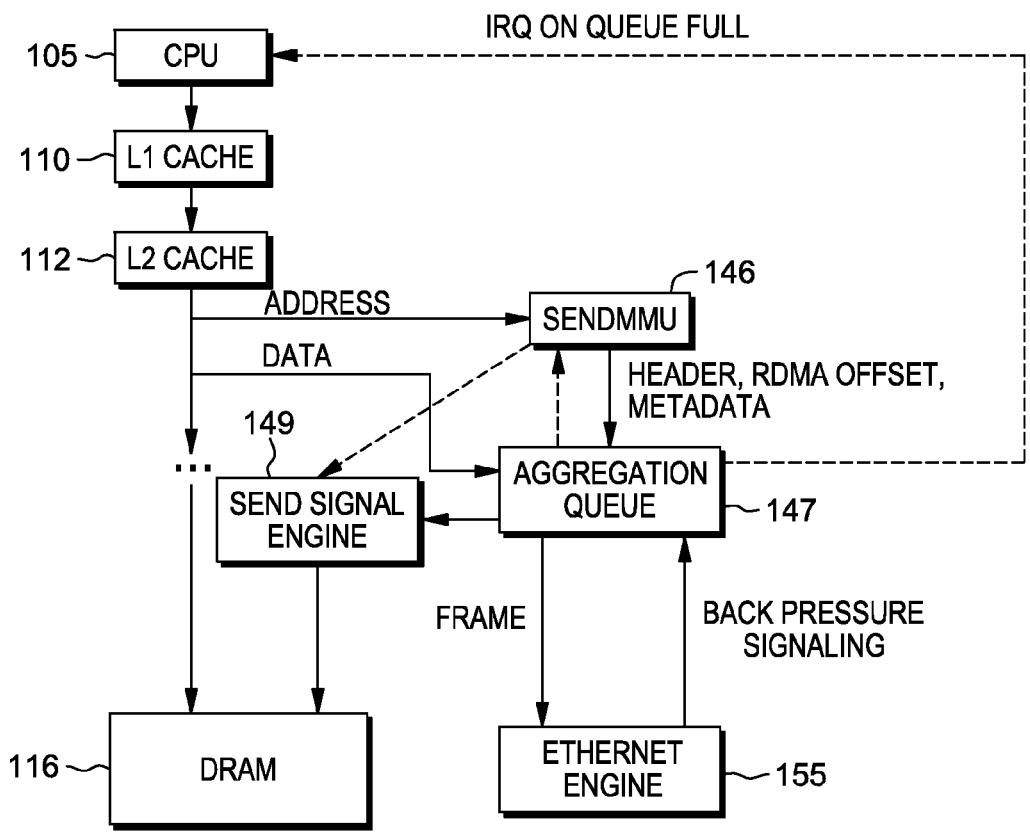
FIG. 3 is a network diagram of an end-to-end scenario for implicit I/O send (network) and write (flash) within implicit I/O send on a cache computing environment, in accordance with embodiments of the present invention.

FIG. 3 is a network diagram of an end-to-end scenario for implicit I/O send (network) and write (flash) within implicit I/O send on cache computing environment 100, in accordance with embodiments of the present invention. CPU 105 writes data into L1/L2 cache, in random order. For example, CPU 105 uses its complete instruction set, including, load or store instructions operating on sendMMU 146 mapped address space to generate the data which is sent to I/O adaptor 150. L1/L2 cache hierarchy summarizes reduced amount of cache load and cache purge instructions forwarded from the L2 cache to L3 or DRAM 116 for storage in aggregation queue 147. Further, according to at least one embodiment, asynchronous L2 destage (write back) is "snooped" by sendMMU 146. For example, sendMMU 146 snoops communication from L2 to other cache levels of CPU 105. As depicted, sendMMU is connected to the L2-L3 interface of CPU 105, and extracts all data written associated with addresses for further analysis by the sendMMU. For example, according to at least one embodiment, sendMMU 146 compares the addresses of snooped cache traffic to the preregistered areas of address space of CPU 105. If there's a match it forwards a match indicator to the aggregation queue 147 for processing.

According to at least one embodiment, sendMMU 146 has a summary capability which ORs all "in flight" indicators for a contiguous area of CPU 105. If the in flight indicators are required by metadata, sendMMU 146 triggers completion signaling to indicate a "no data in flight" for such an area of CPU 105.

According to at least one embodiment, if aggregation queue 147 gets above a certain fill state, aggregation queue 147 then transmits data interrupt request (IRQ) to CPU to initiate execution of another process. This could also be a thread switch mechanism of CPU 105. For example, there are cases where the I/O engine 150 is slower to process data than aggregation queue 147 is in forwarding data. In this case, if aggregation queue 147 reaches a threshold in forwarding data, then aggregation queue 147 transmits data interrupt to the CPU 105 to stop execution of the thread causing aggregation queue 147 full condition of the transmitted data.

Figure 4:
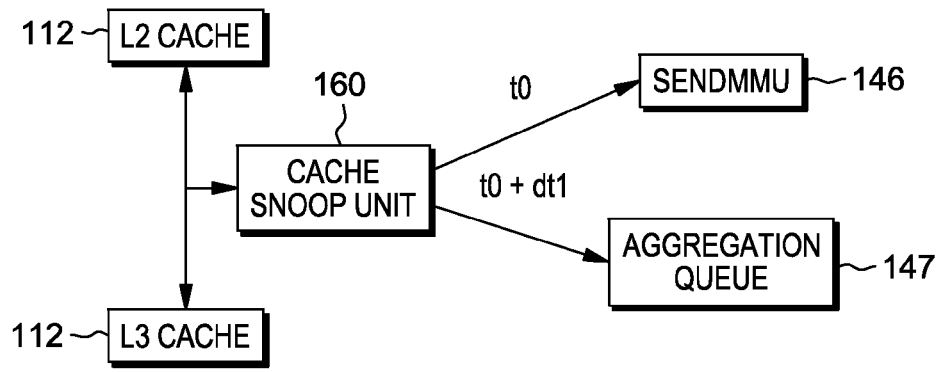
FIG. 4 illustrates a functional block diagram depicting connection between L2/L3 interface of cache control traffic, a sendMMU, a cache snoop unit, and an aggregation queue of an implicit I/O send on cache computing environment for initializing implicit input/output (I/O) write and send requests of a computing system, in accordance with embodiments of the present invention.

FIG. 4 illustrates a functional block diagram depicting connection between L2/L3 interface of cache control traffic 112, sendMMU 146, cache snoop unit 160, and aggregation queue 147, in accordance with embodiments of the present invention.

In the depicted environment, each cacheline, L2, L3 is associated with a tuple virtual address of implicit I/O send on cache computing environment 100. According to at least one embodiment, cache snoop unit 160 listens to protocol between L2 and L3 cache and extracts virtual address information, partition ID, process ID, data of cachelines that associated CPU 105. It then reorders this information to send the address, partition ID to sendMMU 146 with associated data to aggregation queue 147, as described below, in accordance with embodiments of the present invention.

Figure 5:
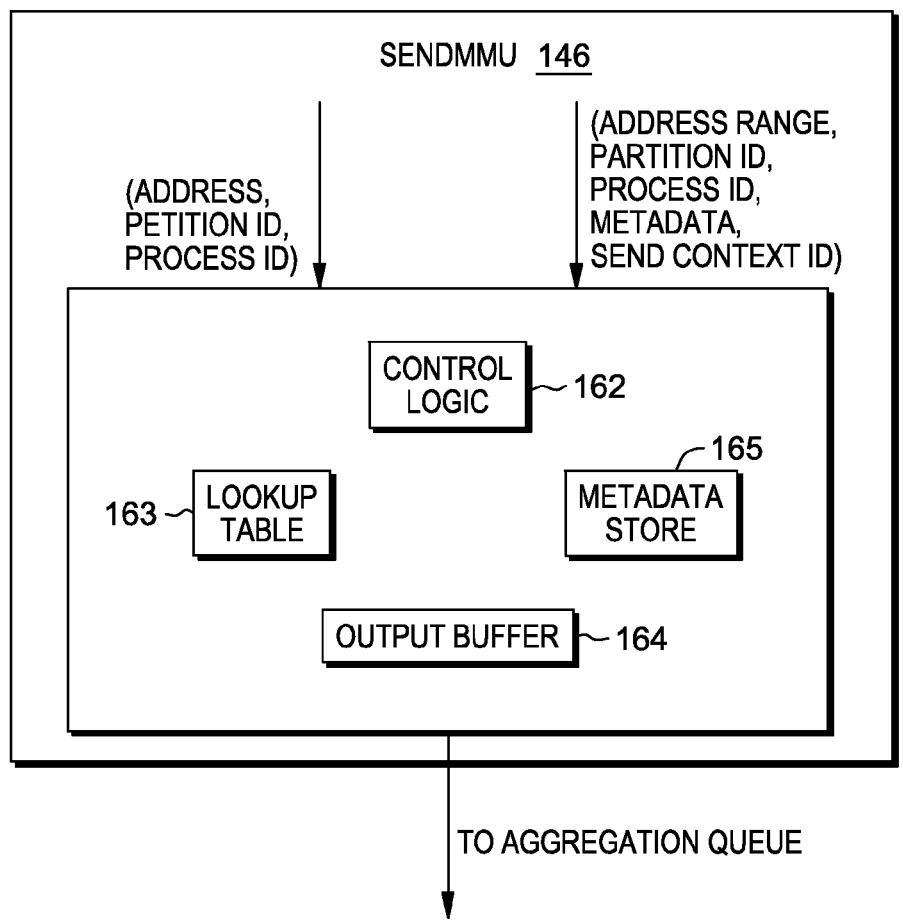
FIG. 5 illustrates a functional block diagram of components of a sendMMU of an implicit I/O send on cache computing environment for initializing implicit input/output (I/O) write and send requests of a computing system, in accordance with embodiments of the present invention.

FIG. 5 illustrates a functional block diagram of components of sendMMU 146, in accordance with embodiments of the present invention.

According to at least one embodiment, sendMMU 146 includes a setup mechanism in CPU 105 that stores tuples of (address range, partition ID, process ID, metadata, send context ID) into SendMMU 146, wherein control logic 162 places the address range, partition ID, process ID into the lookup table, metadata and send context ID into metadata store 165.

SendMMU also includes a remove procedure of CPU 105. According to at least one embodiment, the remove procedure in the CPU stores context ID to be removed from CPU 105. Control logic 162 creates a remove request in output buffer 164 and sends it to aggregation queue 147. SendMMU 146 also includes a lookup procedure of CPU 105, wherein cache snoop unit 160 sends a lookup request to sendMMU 146, control logic 162, and instructs the lookup table to match incoming (address, partition ID, process ID) against all stored (address range, partition ID, process ID). If no match is found, control logic 162 stops any further operation on this (address, partition ID, process ID). However, if a match is found control logic 162 uses the first match to select the associated metadata and sends context ID to the output buffer. In this manner, according to at least one embodiment, control logic 162 stores the value of offset=address_Address_range_start into output buffer 164, then control logic 162 instructs output buffer 164 to forward stored information to aggregation queue 147 of FIG. 1.

Figure 6:
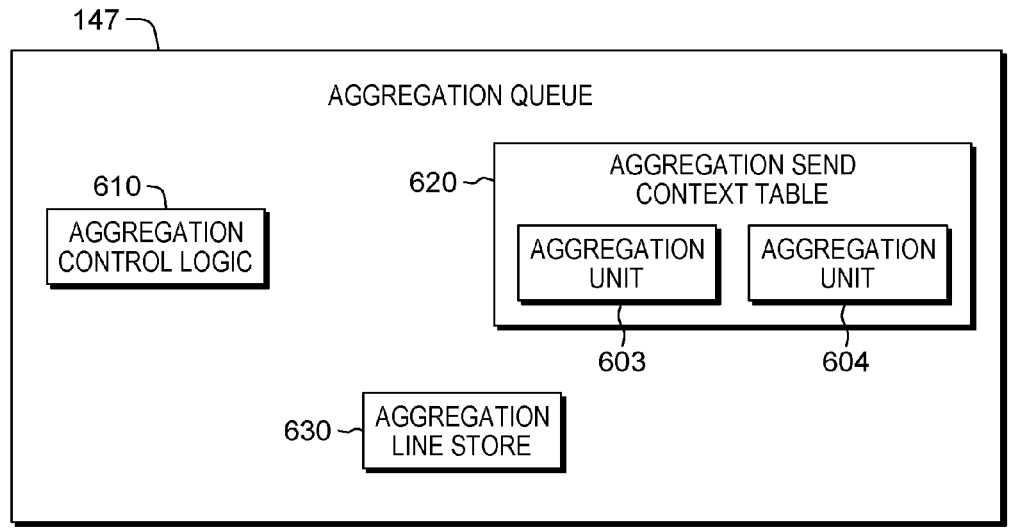
FIG. 6 illustrates a functional block diagram of an aggregation queue in accordance with embodiments of the present invention.

FIG. 6 illustrates a functional block diagram of aggregation queue 147 in accordance with embodiments of the present invention. Aggregation queue 147 receives data packets that contain an offset and cache line data of CPU 105 in memory, wherein aggregation queue 147 aggregates the stored data packets of cache lines per send context to contiguous areas of CPU 105 to be sent out on network of devices of implicit I/O send on cache computing environment 100. Aggregation queue 147 is connected to sendMMU 146, cache snoop unit 160 and send signal engine 149, as described above.

Aggregation queue 147 includes aggregation control logic 610, aggregation send context table 620 and aggregation line store 630. Aggregation control logic 610 controls operations of aggregation queue 147. Aggregation send context table 620 is an array of send contexts of aggregation queue 147, wherein each send context has the same size. Aggregation line store 630 stores lines of data before they are sent out by aggregation queue 147, manages a free list of data internally, and forwards line data to the send engine on request of aggregation queue 147. Moreover, according to at least one embodiment, aggregation send context table 620 includes an array of aggregation unit 603, 604 that are stored by offset within implicit I/O send on cache computing environment 100. According to at least one embodiment, aggregation unit 603, 604 allows halt of search for matching aggregation unit 603, 604, as soon as offset of new data is lower then base of offset of aggregation unit, 603, 604. For example, aggregation unit 603, 604 contains based offset of the aggregated memory, number of aggregated lines, age of the aggregated lines, a circular buffer that contains line store indices of the stored data, and an index into circular buffer pointing to the first element of aggregation queue 147. sendMMU 146 transmits data containing commands for implicit I/O send on cache operations to aggregation queue 147, as described above, in accordance with embodiments of the present invention.

Figure 7:
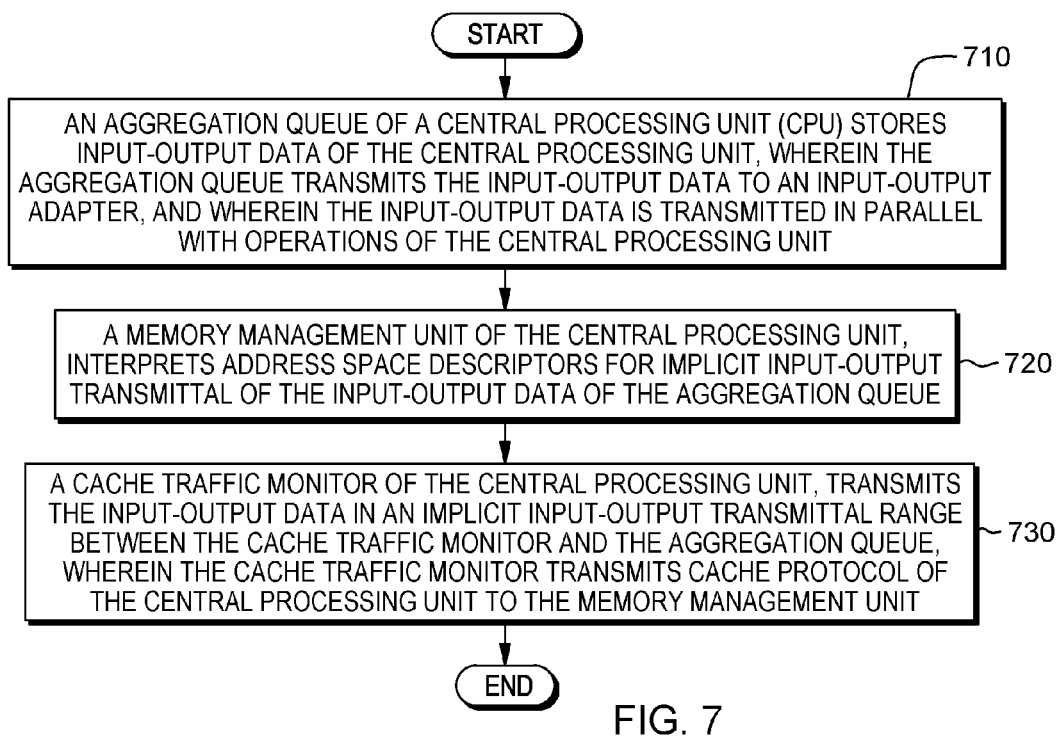
FIG. 7 is a flow diagram by CPU for implicit input-output send on cache operations of within implicit I/O send on cache computing environment, in accordance with embodiments of the present invention.

FIG. 7 is a flow diagram by CPU 105 for implicit input-output send on cache operations of within implicit I/O send on cache computing environment 100. Aggregation queue 147 stores input-output data CPU 105, wherein aggregation queue 147 transmits the input-output data to I/O adaptor 150, and wherein the input-output data is transmitted in parallel with operations of CPU 105. (Step 710). Aggregation queue 147, aggregate the transmitted input-output data of the implicit input-output transmittal range. For example, aggregation queue 147 transmits the aggregated input-output of the implicit input-output transmittal range to an input-output engine of CPU 105. sendMMU 146 interprets address space descriptors of CPU 105 for implicit input-output transmittal of the input-output data of aggregation queue 147 (Step 720). For example, CPU 105 adds preregistered address space descriptors to sendMMU 146 and wherein CPU 105 marks the added preregistered address space descriptors as an implicit input-output operation of CPU 105. Cache traffic monitor, L2, L3 transmits by the input-output data in an implicit input-output transmittal range between the cache traffic monitor L2, L3 and aggregation queue 147, wherein cache traffic monitor L2, L3 transmits cache protocol of the central processing unit to the memory management unit. (Step 730). Moreover, cache traffic monitor L2, L3, monitors the preregistered address space descriptors of CPU 105 for accessing cached memory locations CPU 105. sendMMU 146 compares the interpreted address space descriptors of CPU 105 with the preregistered address space descriptors of CPU 105. For example, if there is a match of address space descriptors between the interpreted address descriptors and preregistered address descriptors, sendMMU 146 transmits the match of the address space descriptors to aggregation queue 147, wherein the match includes implicit input-output data CPU 105. Cache traffic monitor L2, L3 further synchronizes implicit input-output transmittal of input-output data to initiate implicit input-output operations CPU 105.

Figure 8A:
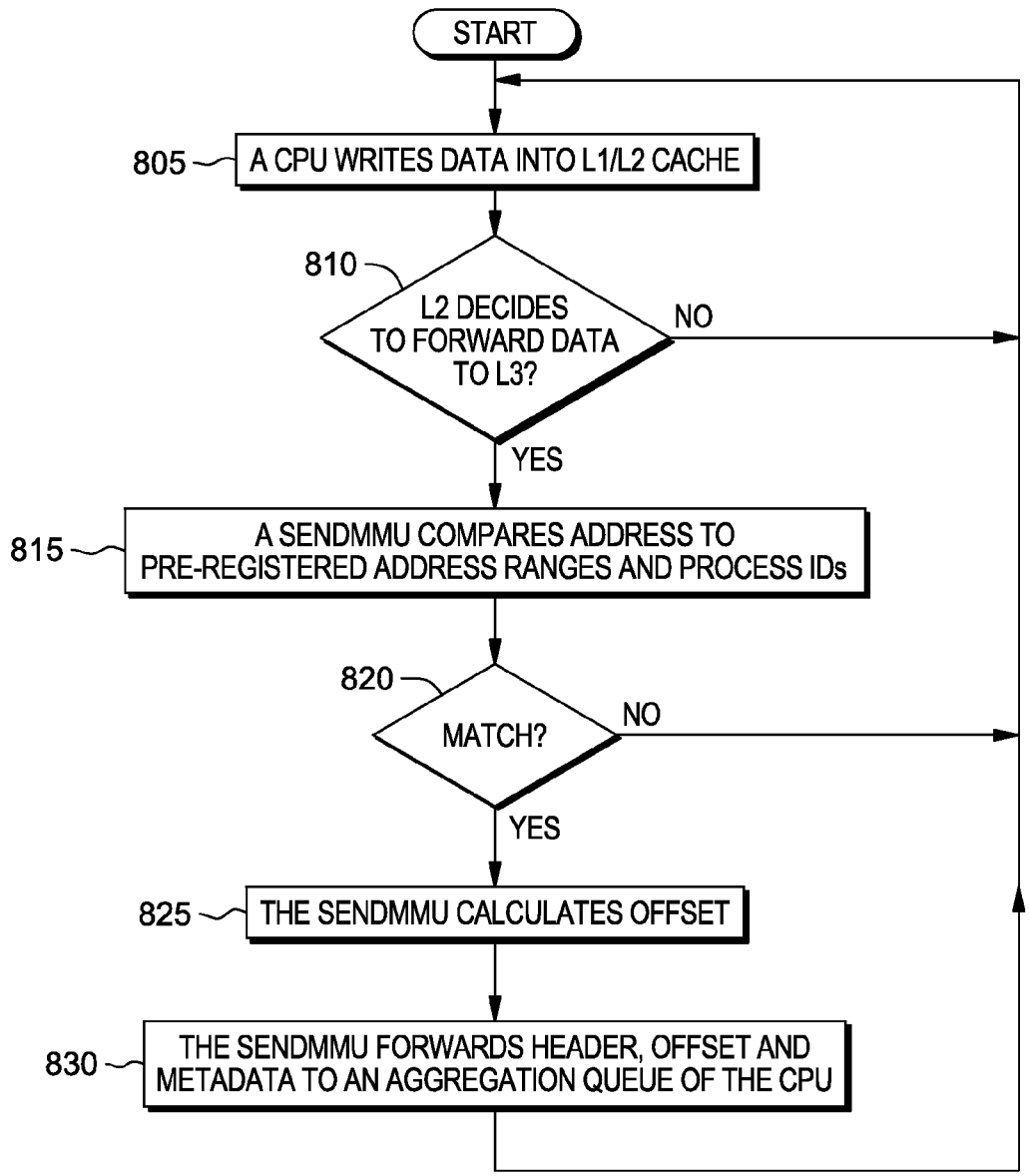
FIGS. 8A-8B are flow diagrams depicting steps performed by a sendMMU and an aggregation queue of an implicit I/O send on cache computing environment, in accordance with embodiments of the present invention.

FIG. 8A depicts step performed by sendMMU 146 for snooping on addresses of cache traffic within a cache hierarchy of CPU 105 during system operations of implicit I/O send on cache computing environment 100, in accordance with embodiments of the present invention. CPU writes data into L1/L2 cache of cache traffic monitor 112. (Step 805). For example, CPU 105 utilizes its complete instruction set, including, load, store, or ALU instructions operating on the sendMMU 146 address space to generate data which should be sent to the I/O adaptor 150. L2 determines whether to forward the data to L3. (Decision 810).

For example, if L2 decides to forward the data, then at step 815, sendMMU 146 compares address descriptors of CPU 105 to preregistered address descriptors and process IDs of CPU 105 to determine if there is a match of address space descriptors. A decision 820, sendMMU 146 determines if there is a match. If there is a match, at step 825, sendMMU 146 calculates the offset snooped address descriptors within registered address descriptors of CPU 105. However, if there is not match, then at step 805, CPU writes data into L1/L2 cache of cache traffic monitor 112. Moreover, at step 830, sendMMU 146 forwards header, offset and metadata to aggregation queue 147.

Figure 8B:
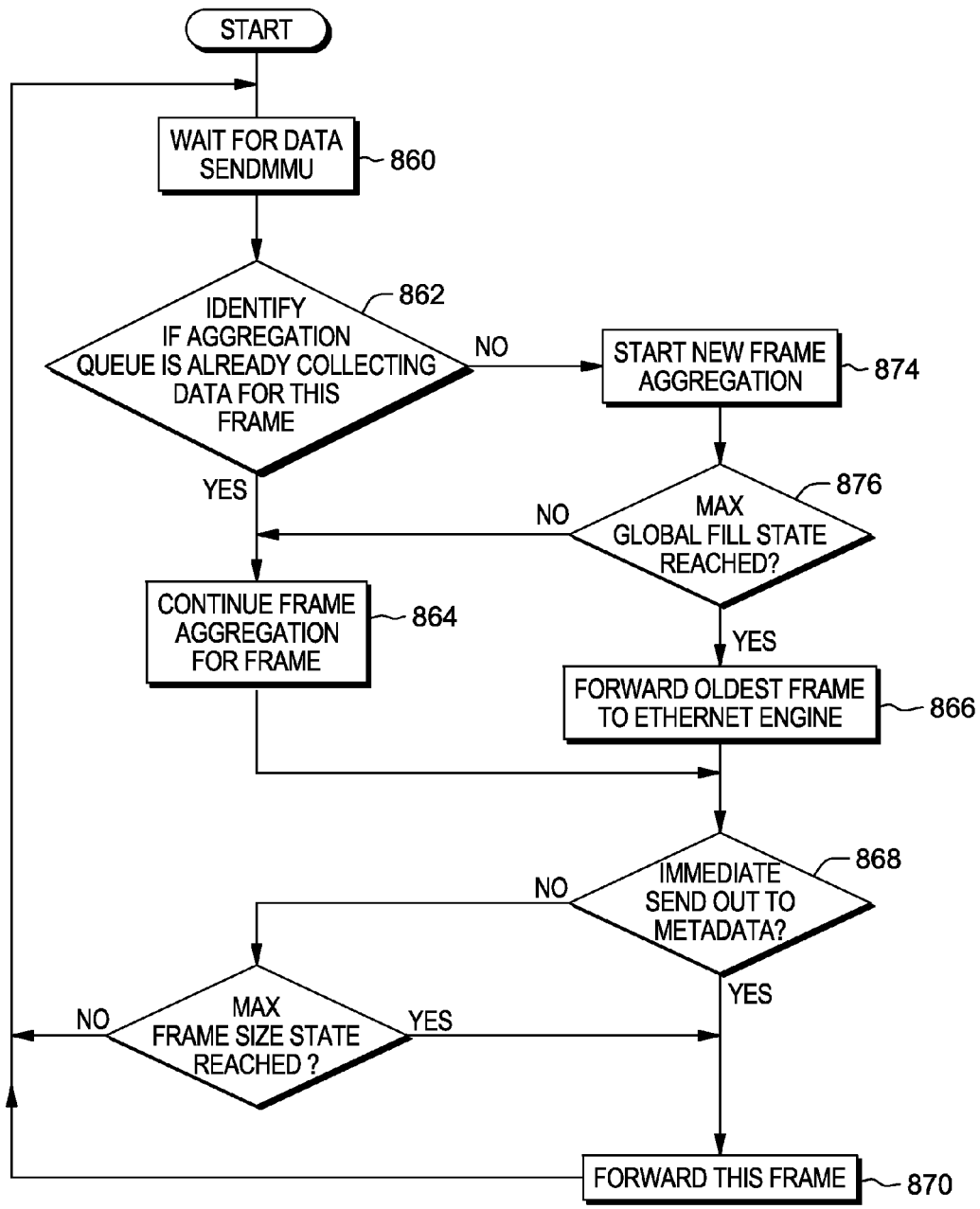

FIG. 8B is a flow diagram by aggregation queue 147 for aggregating stored data packets of cache lines per send context to contiguous areas of CPU 105 within implicit I/O send on cache computing environment 100. Aggregation queue 147 is triggered by data sent from the sendMMU 146. (Step 860). Aggregation queue 147 identifies if aggregation queue is collecting data frame aggregations. (Decision 862). For example, according to at least one embodiment, aggregation queue 147 maintains a directory of current frame aggregations of CPU 105. Identification of frame aggregation is based on an identifier which is part of the metadata provided by the sendMMU 146. If current frame aggregation could not be found, then at step 874, aggregation queue 147 starts a new frame aggregation. Further, aggregation queue determines, at decision 876, if internal buffer of CPU 105 exceeds a certain buffer fill level. If the internal buffer exceeds the buffer fill level, then, at step 866, aggregation queue 147 forwards oldest frame to ethernet engine 155. If the internal buffer does not exceed the certain buffer fill level, then, at step 864, aggregation queue 147 continues to aggregate for frame.

For example, aggregation queue 147 adds a new frame aggregation into its directory and assigns the identifier provided by the sendMMU 146 for this new frame aggregation. Aggregation queue 147 forwards oldest frame to ethernet engine 155. (Step 866). For example, if the fill level of the internal buffer of CPU 105 reaches a certain configurable threshold, the data of oldest aggregation is sent out to the ethernet engine 155. This step is repeated until the fill level goes below a certain configurable threshold.

Aggregation queue 147 determines if immediate send out by metadata of CPU 105. (Decision 868). For example, if the metadata indicates an immediate send out of CPU 105, the data stored in the internal buffer for this frame aggregation is immediately forwarded to the ethernet engine 155 without reaching a threshold. If aggregation queue 147 determines to transmit metadata, then, at step 870, aggregation queue 147 continues to forward oldest frame to ethernet engine 155. However, if aggregation queue 147 decides not to transmit metadata, then, at decision, 872, aggregation queue 147 determines if max size frame has been reached a certain threshold. If the threshold has been reached, then aggregation queue 147 forwards the frame at step 870. However, if a max size has not been reached, then at step 860, aggregation queue 147 is triggered by data sent from the sendMMU 146.

Figure 9:
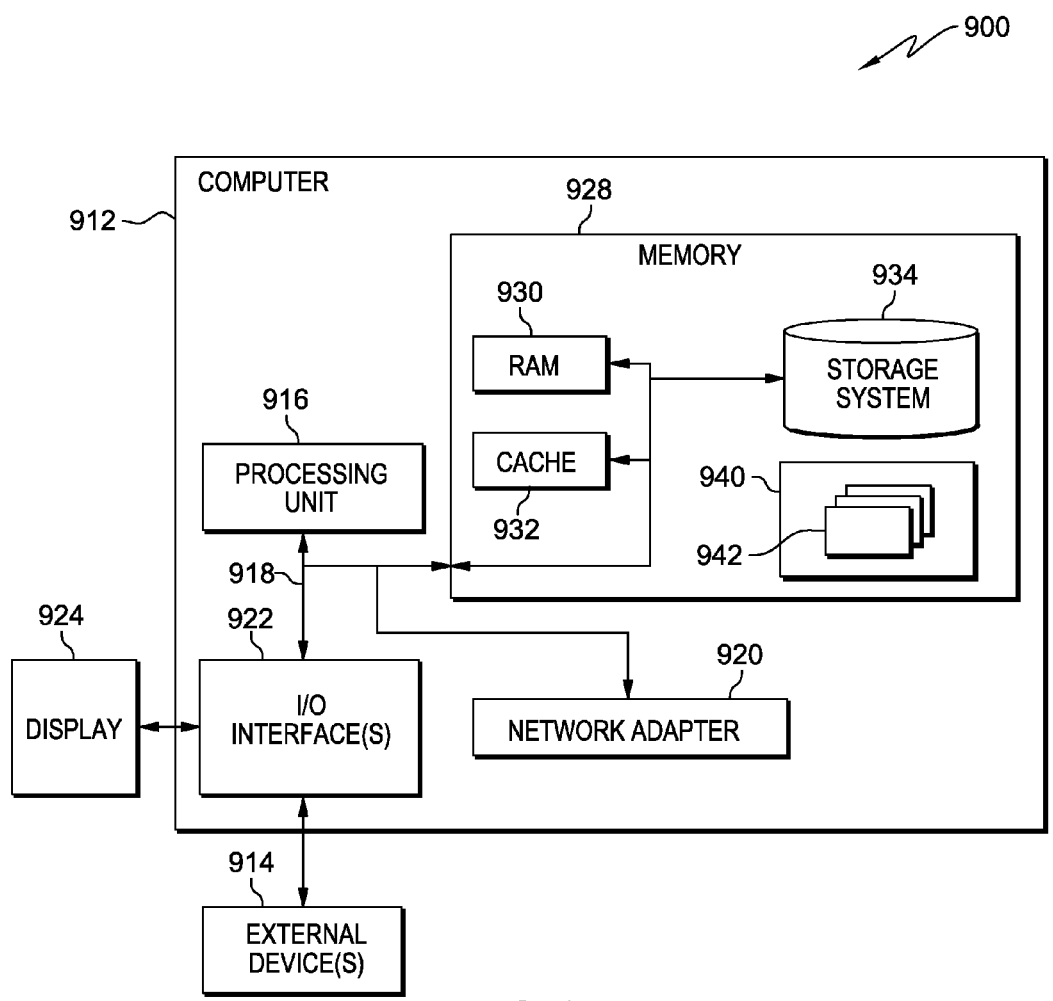
FIG. 9 illustrates a block diagram of components of a computer system in accordance with embodiments of the present invention.

FIG. 9 is a block diagram of a computer system, in accordance with an embodiment of the present invention. Computer system 900 is only one example of a suitable computer system and is not intended to suggest any limitation as to the scope of use or functionality of embodiments of the invention described herein.

Regardless, computer system 900 is capable of being implemented and/or performing any of the functionality set forth hereinabove. In computer system 900 there is computer 912, which is operational with numerous other general purpose or special purpose computing system environments or configurations. Examples of well-known computing systems, environments, and/or configurations that may be suitable for use with computer 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. CPU 105, I/O adaptor 150, memory 115, cache traffic monitor L2, L3 112 can be implemented as an instance of computer 912.

Computer 912 may be described in the general context of computer system executable instructions, such as program modules, being executed by a computer system. Generally, program modules may include routines, programs, objects, components, logic, data structures, and so on that perform particular tasks or implement particular abstract data types. Computer 912 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 9, computer 912 is shown in the form of a general-purpose computing device. The components of computer 912 may include, but are not limited to, one or more processors or processing units 916, memory 928, and bus 918 that couples various system components including memory 928 to processing unit 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 912 typically includes a variety of computer system readable media. Such media may be any available media that is accessible by computer 912, and includes both volatile and non-volatile media, and removable and non-removable media.

Memory 928 includes computer system readable media in the form of volatile memory, such as random access memory (RAM) 930 and/or cache 932. Computer 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Memory 115 may be stored in memory 928 by way of example, and not limitation, as well as an operating system, one or more application programs, other program modules, and program data. Each of the operating system, one or more application programs, other program modules, including, program module 940, and program data or some combination thereof, may include an implementation of a networking environment. For example, program modules 940 and 942 generally carry out the functions and/or methodologies of embodiments of the invention as described herein.

Computer 912 may also communicate with one or more external devices 914 such as a keyboard, a pointing device, etc., as well as display 924; one or more devices that enable a user to interact with computer 912; and/or any devices (e.g., network card, modem, etc.) that enable computer 912 to communicate with one or more other computing devices. Such communication occurs via Input/Output (I/O) interfaces 922. Still yet, computer 912 communicates with one or more networks such as a local area network (LAN), a general wide area network (WAN), and/or a public network (e.g., the Internet) via network adapter 920. As depicted, network adapter 920 communicates with the other components of computer 912 via bus 918. It should be understood that although not shown, other hardware and/or software components could be used in conjunction with computer 912. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to, wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method for implicit input-output send on cache operations of a central processing unit (CPU) have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer system for implicit input-output send on cache operations of a central processing unit, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to store, by an aggregation queue of a central processing unit, input-output data of the central processing unit, wherein the aggregation queue transmits the input-output data to an input-output adaptor, and wherein the input-output data is transmitted in parallel with operations of the central processing unit;
program instructions to interpret, by a memory management unit of the central processing unit, address space descriptors for implicit input-output transmittal of the input-output data of the aggregation queue;
program instructions to transmit, by a cache traffic monitor of the central processing unit, the input-output data in an implicit input-output transmittal range between the cache traffic monitor and the aggregation queue, wherein the cache traffic monitor transmits cache protocol of the central processing unit to the memory management unit; and program instructions to synchronize, by the cache traffic monitor, implicit input-output transmittal of input-output data to initiate implicit input-output operations of the central processing unit.

2. The computer system of claim 1, wherein the central processing unit adds preregistered address space descriptors to the memory management unit, and wherein the central processing unit marks the added preregistered address space descriptors as an implicit input-output operation of the central processing unit.

3. The computer system 1, further includes:

program instructions to monitor, by the cache traffic monitor, preregistered address space descriptors of the central processing unit for accessing cached memory locations of the central processing unit; and program instructions to compare, by the memory management unit, interpreted address space descriptors of the central processing unit with the preregistered address space descriptors of the central processing unit.

4. The computer system of claim 3, wherein if there is a match of address space descriptors between the interpreted address descriptors and preregistered address descriptors, the memory management unit transmits the match of the address space descriptors to the aggregation queue, wherein the match include implicit input-output data of the central processing unit.

5. The computer system of claim 1 further includes: program instructions to aggregate, by the aggregation queue, the transmitted input-output data of the implicit input-output transmittal range.

6. The computer system of claim 5, wherein aggregation queue transmits the aggregated input-output of the implicit input-output transmittal range to an input-output engine of the central processing unit.

7. A computer program product for implicit input-output send on cache operations of a central processing unit, the computer program product comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to store, by an aggregation queue of a central processing unit, input-output data of the central processing unit, wherein the aggregation queue transmits the input-output data to an input-output adaptor, and wherein the input-output data is transmitted in parallel with operations of the central processing unit;

program instructions to interpret, by a memory management unit of the central processing unit, address space descriptors for implicit input-output transmittal of the input-output data of the aggregation queue; and program instructions to transmit, by a cache traffic monitor of the central processing unit, the input-output data in an implicit input-output transmittal range between the cache traffic monitor and the aggregation queue, wherein the cache traffic monitor transmits cache protocol of the central processing unit to the memory management unit; and program instructions to synchronize, by the cache traffic monitor, implicit input-output transmittal of input-output data to initiate implicit input-output operations of the central processing unit.

8. The computer program product of claim 7, wherein the central processing unit adds preregistered address space descriptors to the memory management unit, and wherein the central processing unit marks the added preregistered address space descriptors as an implicit input-output operation of the central processing unit.

9. The computer program product of claim 7, further includes:

program instructions to monitor, by the cache traffic monitor, preregistered address space descriptors of the central processing unit for accessing cached memory locations of the central processing unit; and program instructions to compare, by the memory management unit, interpreted address space descriptors of the central processing unit with the preregistered address space descriptors of the central processing unit.

10. The computer program product of claim 9, wherein if there is a match of address space descriptors between the interpreted address descriptors and preregistered address descriptors, the memory management unit transmits the match of the address space descriptors to the aggregation queue, wherein the match include implicit input-output data of the central processing unit.

11. The computer program product of claim 7 further includes: program instructions to aggregate, by the aggregation queue, the transmitted input-output data of the implicit input-output transmittal range.

\* \* \* \* \*